March 24, 1959  A. J. SORCHY  2,879,417
FAST-ACTING BRAKE FOR DYNAMO-ELECTRIC MACHINES
Filed April 17, 1957
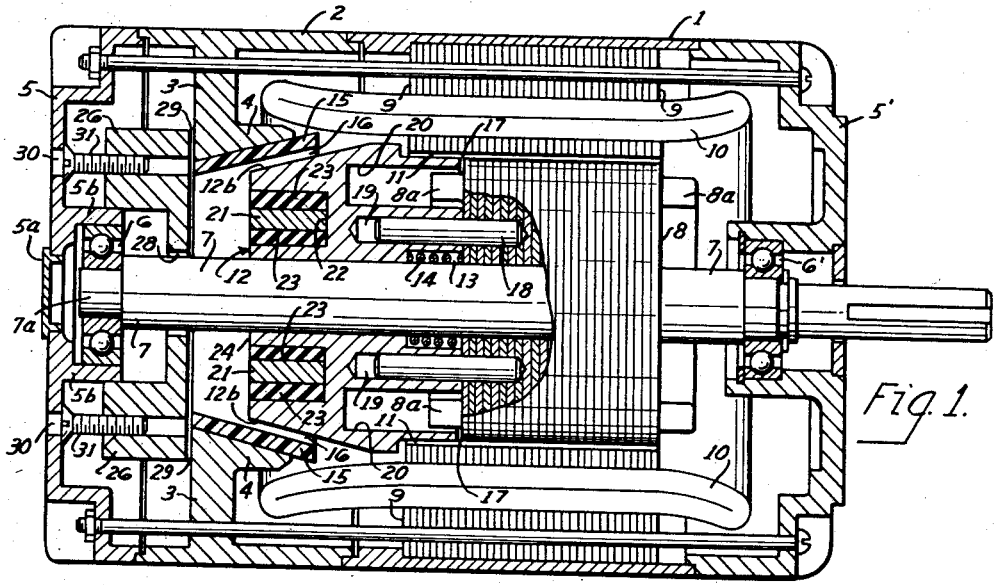
Fig. 1.
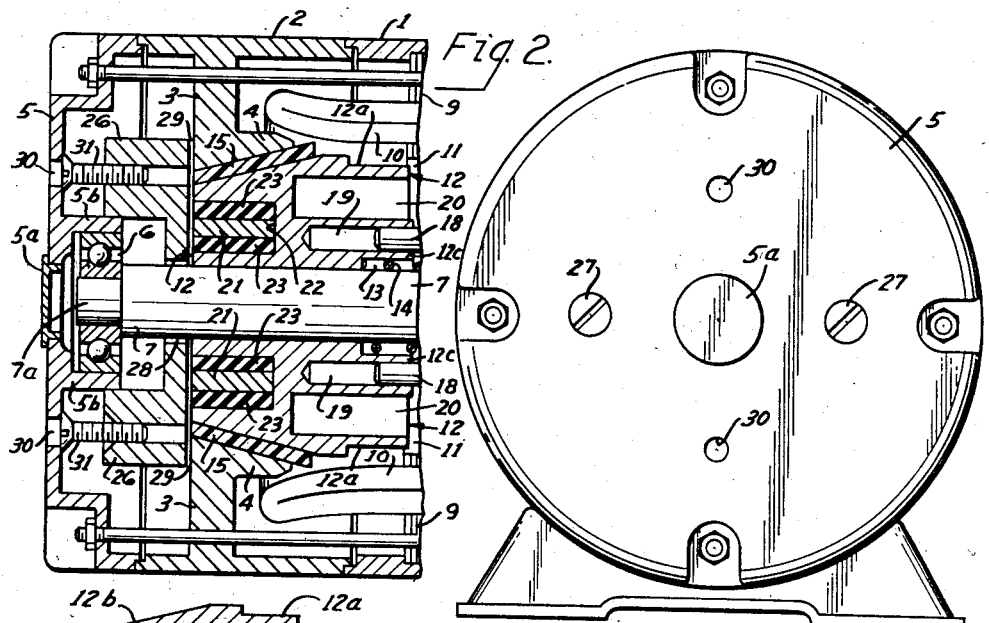
Fig. 2.
Fig. 3.
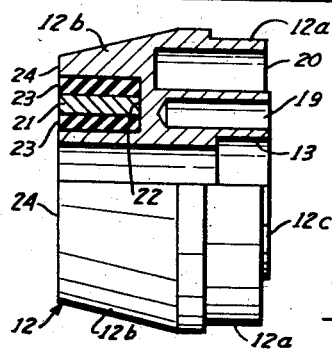
Fig. 4.
INVENTOR.
ANTHONY J. SORCHY
BY
ATTORNEYS.

United States Patent Office 2,879,417
Patented Mar. 24, 1959

2,879,417

FAST-ACTING BRAKE FOR DYNAMO-ELECTRIC MACHINES

Anthony J. Sorchy, Cleveland, Ohio, assignor to The Cleveland Electric Motor Company, Cleveland, Ohio, a corporation of Ohio Application April 17, 1957, Serial No. 653,474

19 Claims. (Cl. 310—77)

This invention relates to a fast-acting brake for a dynamo-electric machine such as a motor.

There are many installations that require a motor brake characterized by a capacity for gradual acceleration and deceleration of the motor, examples being found in motor-driven trolleys of the types commonly used in mechanical handling systems. For these purposes, motor brakes of the kinds described in prior applications Serial Nos. 476,793 and 493,720 (now Patents Nos. 2,827,135 and 2,827,136) are eminently satisfactory. On the other hand, there are circumstances in which gradual acceleration and deceleration are not well suited to the needs of the installation, as when a trolley incorporating an electric motor must operate on an incline. Also, in electrically-powered hoists operating directly on heavy loads that are to be raised or lowered, gradual acceleration and deceleration are not usually of advantage. Under such circumstances, a fast-acting brake such as that of prior application Serial No. 566,891 (now Patent No. 2,802,121) is a desideratum.

The present invention, which constitutes an improvement on the brake of the last-mentioned application, consists in and has for one of its objects the provision of a simple, sturdy brake for a motor or other form of dynamo-electric machine intended to operate under conditions in which rapid acceleration and deceleration of the machine are desirable. To that end, the invention provides a brake with a minimum number of movable parts in which the movable brake element is moved out of brake-set position immediately upon energization of the machine and in which, upon de-energization of the machine, it is moved almost instantly into brake-set position. In the preferred embodiment of the present invention, the movable brake element is firmly held in brake-set position as long as the machine is de-energized. Movement into and out of the brake-set position is prompt, sure and effective, regardless of whether the movement is in brake-setting or in brake-releasing direction.

The invention further consists in and has as an object the provision of a brake which is easy to make, assemble and adjust, which is economical to manufacture, and which when incorporated in a motor or other dynamo-electric machine adds only a minimum to the over-all length of unit. In the hereinafter-described embodiment of the invention, these advantages derive in part from the fact that replaceable brake lining material in sheet form is used in making up the stationary brake element, in part from the fact that the stator and plunger overlap in very considerable degree even when the parts are in brake-set position, and in part from the fact that the magnet used to insure prompt braking action is incorporated in the plunger itself. As a corollary of the latter feature, it is possible to dispense with the shaft-mounted retainer used in prior constructions and replace it by a simple pole piece the location of which can be varied at will from the exterior of the housing without having to remove the end bell to do so.

Other objects, advantages and features of the invention will be apparent from the detailed description which follows and from the accompanying drawings, in which:

Figure 1 is a central vertical section through a motor and brake showing the movable parts of the latter in brake-released position.

Figure 2 is a central vertical section through the brake alone showing the movable parts in brake-set position.

Figure 3 is an end elevation of the motor and stand seen as if from the left in Figures 1 and 2.

Figure 4 is a view of the plunger, partly in section and partly in elevation.

In Figures 1 and 2, which show the brake of the present invention as applied to an electric motor of the squirrel-cage type, housing 1 encloses the usual stator and rotor. At its left-hand end, seen as in Figures 1 and 2, is a housing extension 2 incorporating an integrally formed web 3 that extends normally to the axis of rotation. Web 3 carries a longitudinally extending flange 4. Completing the left-hand end of the housing is the usual end bell 5, which is provided with an end cap 5a and an inwardly extending circular flange 5b for the usual ball bearing assembly 6. At the opposite end of the motor is a similar end bell 5' and a like ball bearing assembly 6'.

Motor shaft 7 extends through the housing and housing extension into the end bell, where it terminates in the ball bearing assembly. The outboard end of the shaft is reduced as at 7a to accommodate the inner race of the ball bearing assembly. Within housing 1, shaft 7 mounts a rotor 8 incorporating a core piece 8a made up of conductor bars. Surrounding and overhanging rotor 8 is a stator 9. Forming part of stator 9 is an asymmetrically supported field winding 10. At its left-hand end, stator 9 not only overhangs rotor 8 but extends far beyond it into housing extension 2 in the manner shown in Figures 1 and 2. Within the overhanging portion is formed a fairly deep chamber 11, more or less circular in outline, adapted to receive not only the proximate end but also a large part of the body of a metal plunger 12.

Plunger 12, best seen in Figure 4, is preferably made of cast iron but may be made of any of the metals conventionally used in solenoid plungers. The end 12a of plunger 12 which adjoins rotor 8 is provided with a recess 13 for receiving a spring 14 that tends to bias the plunger 12 toward brake-set position: see Figure 2. In diameter, it is somewhat less than the minimum diameter of stator 9, thus permitting movement of the plunger into and out of chamber 11. The opposite end of plunger 12, designated 12b, is frusto-conical in shape. Plunger 12 is slidable on the surface of shaft 7, there being between them a clearance of a few thousandths of an inch.

A second frusto-conical surface tapering in complementary fashion is formed on the inside face of longitudinal flange 4. It is lined at 15 with a conventional brake lining constituted of four generally trapezoidal segments that are disposed in reversed relation to each other. They are cemented in place by means of a commercial epoxy resin adhesive. Either flange 4 or lining 15 or both may be regarded as constituting the stationary brake element.

The movable brake element, i.e., the frusto-conical surface on the outer end portion of plunger 12, engages brake lining 15 when the parts are in the brake-set position shown in Figure 2. When the parts are in brake-released position, shown in Figure 1, there is a clearance 16 between brake lining 15 and the outer end 12b of plunger 12. Under these conditions, there is also a rather shallow clearance 17 between rotor 8 and the periphery of plunger 12 which comes about as a result of the incorporation of an annular stop 12c in end 12a of plunger 12: see Figures 2 and 4.

In order that plunger 12 may turn with rotor 8, the latter is provided with two outwardly extending metal driving pins 18. The supported ends of these pins are fixed firmly in place in rotor 8. Their free ends are received in long, narrow cylindrical bores 19 in plunger 12. Thus the construction is such that pins 18 must rotate with rotor 8 and therefore with shaft 7, to which the rotor is attached. However, plunger 12 is free to slide along the surface of the shaft.

At its inner end plunger 12 is formed with an annular hollow 20 accommodating core piece 8a of rotor 8: see Figure 1.

In the outer end of plunger 12 is an annulus 21 of ferromagnetic material. Preferably, it is of a highly magnetic material such as the Indiana Steel Products Company's alloy "Hyflux Alnico V," which is understood to be a precipitated hardened alloy of iron, nickel, cobalt, copper and aluminum. It is positioned in an annular recess 22 in the end of the plunger and is jacketed at 23 as hereinafter explained. The end face 24 of the plunger and the exposed face of annulus 21 preferably form a flush surface, as illustrated in Figure 4.

Annulus 21 is held in place by a non-magnetic material, preferably a cured epoxide resin. A number of suitable epoxide resins are commercially available in monomeric form from suppliers of synthetic resins. The resin is introduced in liquid form into the spaces between the side walls of annulus 21 and the adjoining surfaces of plunger 12. It is caused to cure by means of a liquid catalyst. In the presence of the latter, it develops in situ into the jacket 23 which serves to bond annulus 21 in place. In effect, annulus 21 becomes an integral part of plunger 12.

After annulus 21 has been incorporated in plunger 12, the entire plunger is magnetized by exposure to a strong magnetic field. Thereafter, annulus 21 acts as one and the body of the plunger acts as the other of the two poles of a permanent magnet. The magnetic force which it produces, abetted by spring 14, is utilized as hereinafter explained to hold the movable and stationary brake elements in engagement when the parts are in the brake-set position illustrated in Figure 2.

In apposition to the outer end of plunger 12 is an annular pole piece 26 of cast iron. Pole piece 26 is held in place in end bell 5 by two adjusting screws 27. These screws do not appear in Figures 1 and 2, which represent vertical sections through the motor and motor brake, but do appear in Figure 3. Screws 27, which project through suitable openings (not shown) in end bell 5, serve to locate pole piece 26 in any desired position of adjustment in relation to web 3. In ordinary circumstances, there will be an annular clearance 28 between pole piece 26 and shaft 7 and an end clearance 29 of variable extent between pole piece 26 and the outside face of web 3.

In adjusting the position of pole piece 26, screws 27 are rotated counter-clockwise until pole piece 26 has moved into contact with web 3. Screws 27 are then rotated clockwise until the heads of the screws seat in end bell 5. Continued movement of screws 27 in the same clockwise direction results in outward movement of pole piece 26 and the development of end clearance 29, which may be as large or small as desired, depending on the extent to which screws 27 are rotated in the clockwise direction.

In order to lock pole piece 26 in place in the desired position, two access openings 30 are formed in end bell 5 and two lock screws 31 are provided as shown in Figures 1 and 2. By counter-clockwise manipulation of screws 31 through access opening 30, screws 31 may be backed away from pole piece 26 until the heads of the screws engage the inside face of end bell 5. At this stage, pole piece 26 is held fixedly in position. By rotating screws 31 in the clockwise direction, pole piece 26 can be freed for further adjustment by operating on screws 27. Thus an extremely simple system is provided for adjusting and holding pole piece 26 in place.

Between plunger 12 and pole piece 26 there is a strong mutual attraction arising out of this incorporation of annulus 21 in plunger 12 and the subsequent magnetization operation. However, pole piece 26 is not free to move, being locked in place by screws 27 and 31. Accordingly, the mutual attraction between plunger 12 and pole piece 26 can manifest itself only in movement of the plunger toward the pole piece; i.e., in movement of the plunger into the brake-set position shown in Figure 2. The parts attain the brake-released position shown in Figure 1 only after energization of the motor as hereinafter explained. If the motor is not energized, the magnetic attraction between plunger 12 and pole piece 26, aided by spring 14, keeps the plunger in its brake-set position.

Upon energization of the motor, a powerful electrical field is developed within stator 9. That portion of the stator which overhangs rotor 8 exerts a strong attraction for plunger 12 which, as already noted, is slidably mounted on shaft 7. The attractive force is particularly strong at the outset; i.e., during the period when rotor 8 and shaft 7 first begin to turn. As the attractive force develops, it pulls plunger 12 out of brake-set position, notwithstanding the biasing action of spring 14 and the magnetic attraction between plunger 12 and pole piece 26. After the motor is once running under full load, the initial attractive force diminishes considerably; however, it remains effective insofar as concerns plunger 12, which continues to be attracted by it.

The brake-releasing action is prompt, providing virtually immediate release of plunger 12 from brake-set position. So long as the motor is in operation, the force exerted by spring 14 on plunger 12 is not sufficient to urge the plunger into brake-set position in opposition to the attractive force developed by stator 9. This force continues to dominate even though reduced in magnitude during the period when the motor is operating under full load. However, when the motor is de-energized, the attractive force exerted by stator 9 rapidly disappears, whereupon spring 14 initiates return movement of plunger 12 toward brake-set position.

As this movement develops, plunger 12 moves closer to pole piece 26. When the mutual attraction between the two begins to make itself felt, there results a rapidly accelerated movement of the plunger toward brake-set position. Thus the brake-setting action, like the brake-releasing action, is characterized by prompt response on the part of the plunger, this notwithstanding the fact that the plunger is of massive size and subject to the operation of substantial inertia forces. These are reduced somewhat by the presence of annular chamber 20 in which core 8a of stator 8 is received when the parts are in brake-released position.

Thus the invention provides a brake for a dynamo-electric machine such as a motor which is simple, sturdy and virtually fool-proof. Being easily manufactured, the parts are relatively inexpensive. The cost of assembling them is not excessive. The action of the brake is unusual because of the very rapid response of the plunger to the immediate needs of the situation, whether the movement is from brake-set into brake-released position or vice versa. Because the brake-setting action is so prompt, a motor under full load can be brought to a complete halt in a matter of a very few seconds.

It is evident that modifications may be made without departing from the spirit of the invention by those versed in the art to which the invention relates. Thus the plunger may take some different form or, if desired, may be coupled in different fashion to the shaft. The magnet assembly may take other forms than that shown in the drawings; for example, it may incorporate a plurality of individual magnets spaced from each other at equal angular distances about the axis of the plunger. The pole piece may be differently shaped and/or differently located. Other means for adjusting its position may be provided, if desired. Other changes will suggest themselves to those skilled in the art.

It is intended that the patent shall cover, by summarization in appended claims, all features of patentable novelty residing in the invention.

What is claimed is:

1. In a dynamo-electric machine, supporting structure; a shaft mounted for rotation within the supporting structure; a rotor on the shaft; a stator surrounding the rotor, the stator windings overhanging the rotor in such manner as to form a chamber adjacent one end of the rotor; a plunger mounted on the shaft for movement into and out of a position in which the proximate end of the plunger is disposed within the chamber formed by the stator windings; a stationary braking surface on the supporting structure; a movable braking surface on the plunger; a stationary pole piece within the supporting structure, said pole piece being accessible for adjustment from the exterior of the supporting structure; and, for urging the plunger toward the pole piece into a position in which the two braking surfaces are in engagement, magnetic means incorporated in the plunger itself.

2. A dynamo-electric machine as in claim 1 in which the magnetic means include a permanent magnet.

3. A dynamo-electric machine as in claim 2 in which the magnet is a ring magnet.

4. In a dynamo-electric machine, supporting structure; a shaft mounted for rotation within the supporting structure; a rotor on the shaft; a stator surrounding the rotor; a plunger mounted on the shaft for movement into and out of a position in which the plunger adjoins the rotor; stationary and movable braking surfaces on the supporting structure and plunger, respectively; a stationary pole piece within the supporting structure, said pole piece being accessible for adjustment from the exterior of the supporting structure; and, for urging the plunger away from the rotor, a magnet assembly incorporated in the plunger itself.

5. A dynamo-electric machine as in claim 4 in which the magnet assembly includes one or more permanent magnets disposed symmetrically of the longitudinal axis of the plunger.

6. A dynamo-electric machine as in claim 4 in which the magnet assembly includes a ring magnet the central axis of which coincides with the longitudinal axis of the plunger.

7. A dynamo-electric machine as in claim 6 in which the plunger itself is magnetized.

8. A dynamo-electric machine as in claim 7 in which the plunger is biased toward brake-set position by a release spring operating on its inner end.

9. In a dynamo-electric machine, supporting structure; a shaft mounted for rotation within the supporting structure; a rotor on the shaft; a stator surrounding the rotor; a plunger slidably mounted on the shaft for movement into and out of a position in which the plunger adjoins the rotor; drive pins slidably interconnecting the plunger and the rotor, said drive pins being mounted in one and projecting into the other thereof; stationary and movable braking surfaces on the supporting structure and plunger, respectively; and magnetic means for urging the plunger away from the rotor.

10. A dynamo-electric machine as in claim 9 in which a permanent magnet is used to urge the plunger away from the rotor.

11. A dynamo-electric machine as in claim 10 in which the permanent magnet is in the plunger itself.

12. In a dynamo-electric machine, supporting structure; a shaft mounted for rotation within the supporting structure; a rotor on the shaft; a stator surrounding the rotor; a plunger mounted on the shaft for movement into and out of a position in which the plunger adjoins the rotor; stationary and movable brake elements on the supporting structure and plunger, respectively; a magnet incorporated in the plunger; and, in apposition to the plunger, a stationary pole piece in juxtaposition to the surface of the shaft.

13. A dynamo-electric machine as in claim 12 in which the pole piece is so designed, constructed and arranged that it is out of contact with the shaft surface.

14. A dynamo-electric machine as in claim 13 in which the pole piece is carried by the supporting structure in such manner that its position can readily be adjusted from the exterior of the supporting structure.

15. A dynamo-electric machine as in claim 14 in which the supporting structure is provided with access openings for adjusting the position of the pole piece.

16. In a dynamo-electric machine, supporting structure including a housing and end bells on the housing; a shaft mounted for rotation within the housing; a rotor on the shaft; a stator surrounding the rotor, the stator windings overhanging the rotor in such manner as to form a chamber adjacent one end of the rotor; a plunger slidably mounted on the shaft for movement into and out of a retracted position in which the plunger is disposed within the chamber formed by the stator windings; a magnet incorporated in the plunger; and, in apposition to the outer end of the plunger, a pole piece so mounted on one of the end bells that it can be adjusted axially of the shaft without requiring removal of the end bell.

17. In a dynamo-electric machine, the sub-combination comprising a rotor; a plunger; one or more drive pins extending from one to the other thereof; a permanent magnet in the plunger; and braking means on the surface of the plunger.

18. In a dynamo-electric machine, the subcombination comprising a rotor, said rotor having a core piece; a plunger; one or more drive pins extending from one to the other thereof; means in the plunger for receiving the projecting portion of the core piece; and braking means on the surface of the plunger.

19. In a dynamo-electric machine, the sub-combination comprising a rotor, said rotor having a core piece; a plunger; one or more drive pins extending from one to the other thereof; means in the plunger for receiving the projecting portion of the core piece; a magnet incorporated in the plunger; and braking means on the surface of the plunger.

References Cited in the file of this patent
UNITED STATES PATENTS

| | | |
|---|---|---|
| 2,480,291 | Gerentes | Aug. 30, 1949 |
| 2,489,365 | Broussouse | Nov. 29, 1949 |
| 2,802,121 | Sorchy | Aug. 6, 1957 |